United States Patent
Horng et al.

(10) Patent No.: US 7,755,246 B2
(45) Date of Patent: Jul. 13, 2010

(54) POLE PIECE STRUCTURE OF STATOR WITH RADIAL WINDING

(75) Inventors: Alex Horng, Kaohsiung (TW);
Jhin-Nan Chen, Kaohsiung (TW);
Chi-Min Wang, Kaohsiung (TW);
Hung-Chin Mai, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 323 days.

(21) Appl. No.: 11/987,044

(22) Filed: Nov. 27, 2007

(65) Prior Publication Data

US 2009/0096316 A1    Apr. 16, 2009

(30) Foreign Application Priority Data

Oct. 12, 2007    (TW) ............................... 96138303 A

(51) Int. Cl.
*H02K 1/06* (2006.01)
(52) U.S. Cl. ............................ 310/216.112; 310/216.72; 310/216.73
(58) Field of Classification Search .......... 310/216.064, 310/216.072–216.074, 216.091, 216.096, 310/216.111, 216.112
See application file for complete search history.

(56) References Cited

U.S. PATENT DOCUMENTS

| 4,636,671 | A | * | 1/1987 | Terada | .......................... 310/74 |
|---|---|---|---|---|---|
| 5,739,620 | A | * | 4/1998 | Wu et al. | .............. 310/216.092 |
| 6,774,524 | B2 | * | 8/2004 | Fujinaka | .............. 310/216.094 |
| 7,015,614 | B2 | * | 3/2006 | Sakuma et al. | .......... 310/156.53 |
| 7,605,517 | B2 | * | 10/2009 | Enomoto et al. | ............. 310/257 |
| 2004/0056553 | A1 | * | 3/2004 | Fujinaka | ...................... 310/216 |
| 2004/0056555 | A1 | * | 3/2004 | Fujinaka | ...................... 310/216 |
| 2004/0056557 | A1 | * | 3/2004 | Enomoto et al. | ............. 310/218 |
| 2004/0066109 | A1 | * | 4/2004 | Fujinaka | ...................... 310/216 |
| 2008/0143210 | A1 | * | 6/2008 | Wang et al. | .................. 310/216 |

\* cited by examiner

*Primary Examiner*—Thanh Lam
(74) *Attorney, Agent, or Firm*—Alan Kamrath; Kamrath & Associates PA

(57) ABSTRACT

The present invention relates to a pole piece structure of stator with radial winding, which employs an optimum ratio $\alpha$ to define the form of the pole piece, increase the overlap region of inductance and torque and lower the cogging torque of a motor, so as to strengthen the self-starting capability of the motor and minimize torque ripple to enhance the overall performance of the motor. The pole piece structure includes a hub having a hole at the center, and a plurality of poles integrally formed on the periphery of the hub, extended to radiate in a radial direction, and having a pole shoe expanded from an end of each pole in a tangential direction, wherein the angle of a single pole shoe is divided by a pitch angle of two adjacent poles to obtain a ratio in a range of 0.86~0.95.

6 Claims, 3 Drawing Sheets

POLE PIECE STRUCTURE OF STATOR WITH RADIAL WINDING

FIELD OF THE INVENTION

The present invention relates to a pole piece structure of stator with radial winding, and more particularly to one that defines the form of the pole piece with an optimum ratio $\alpha$ to increase the overlap region of inductance and torque and lower the cogging torque of a motor, thereby strengthening the self-starting capability of the motor and minimizing torque ripple to enhance the overall performance of the motor.

BACKGROUND OF THE INVENTION

A stator structure with radial winding is constituted by stacking a plurality of pole pieces of the same shape and winding metal conductor around the pole teeth, wherein the pole piece structure is as shown in FIG. 1. The pole piece formed by punching a plate material with a proper thickness and an excellent magnetic property includes a hub 10 having a hole 11 at the center, a plurality of poles 12 (six in FIG. 1) integrally formed with the hub 10, extended from the periphery of the hub 10 to radiate in a radial direction, and having a pole shoe 13 expanded from an end of each pole in a tangential direction, in which those poles 12 extended in a radial direction are wound around by metal conductor to form a stator structure with radial winding, and the pole shoe 13 that is tangentially expanded serve as the end of a sensing pole of the stator structure with radial winding.

The bigger the end (i.e. pole shoe) of the sensing pole of the stator structure with radial winding is, the larger the overlap region of interphase inductance and torque of a motor is. This effect will result in stronger self-starting capability, large output torque, and little torque ripple of a motor. In contrast, the larger the pole shoe 13 of the pole piece is, the smaller the gap between two adjacent pole shoes 13 will be, rendering the job of winding metal conductor even tougher.

If a mechanical angle $\beta$ of the width of the pole shoe 13 is divided by a mechanical pole pitch angle $\theta$ of two adjacent poles 12, a ratio $\alpha$ is obtained.

$$\frac{\beta}{\theta} = \alpha$$

The value of $\alpha$ is proportional to the angle of $\beta$, that is, the more the angle of $\beta$ is, the larger the value of $\alpha$ is. The values of $\alpha$ for the existing pole piece structures of stator with radial winding are all within a range of 0.65~0.85.

What the electronic information products and consumer electronics are concerned about nowadays is a high-efficiency operation. Hence, the demand for motor performance is getting higher. Whereas, the form of pole piece defined by such ratio (0.65~0.85) is unable to make the most of the performance of motor, making the pole piece fail to keep abreast with the increasingly strict demand for motor performance from the industries.

SUMMARY OF THE INVENTION

In view of the foregoing concern, the present invention thus provides a pole piece structure of stator with radial winding, which defines the form of pole piece with an optimum ratio $\alpha$ to increase the overlap region of inductance and torque and lower the cogging torque of a motor, so as to strengthen the self-starting capability of the motor and minimize torque ripple to enhance the overall performance of the motor.

The pole piece includes a hub having a hole at the center; a plurality of poles integrally formed with the hub, extended from the periphery of the hub to radiate in a radial direction, and having a pole shoe expanded from an end of each pole in a tangential direction, in which the angle of single pole shoe is divided by the pitch angle of two adjacent poles to obtain a ratio in a range of 0.86~0.95.

As a result, the end (i.e. pole shoe) of sensing pole of motor is increased so as to result in larger overlap region of interphase inductance and torque of motor, stronger self-starting capability, large output torque, and small torque ripple to enhance the overall efficacy of a motor.

DETAILED DESCRIPTION OF THE PREFERRED EMBODIMENT

Figure 1:
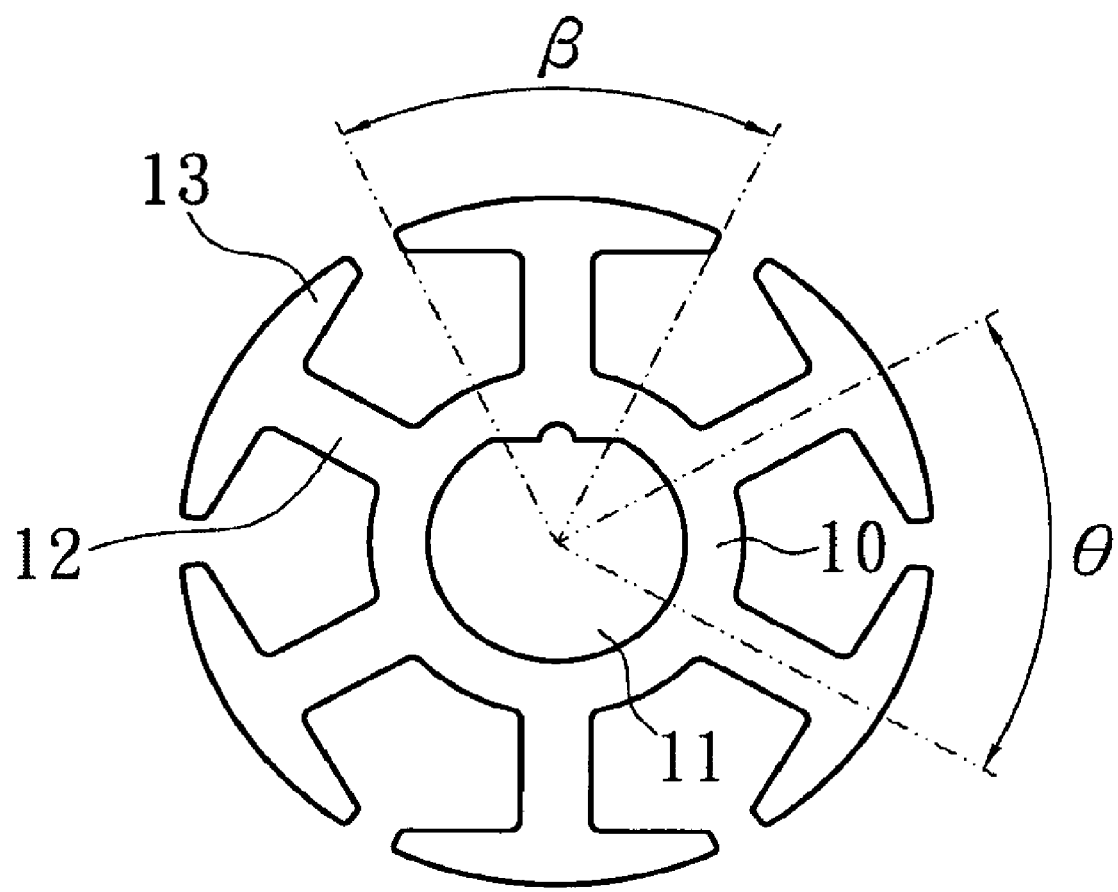
FIG. 1 is a schematic view showing a pole piece of stator with 6-pole radial winding of the present invention.
Figure 2:
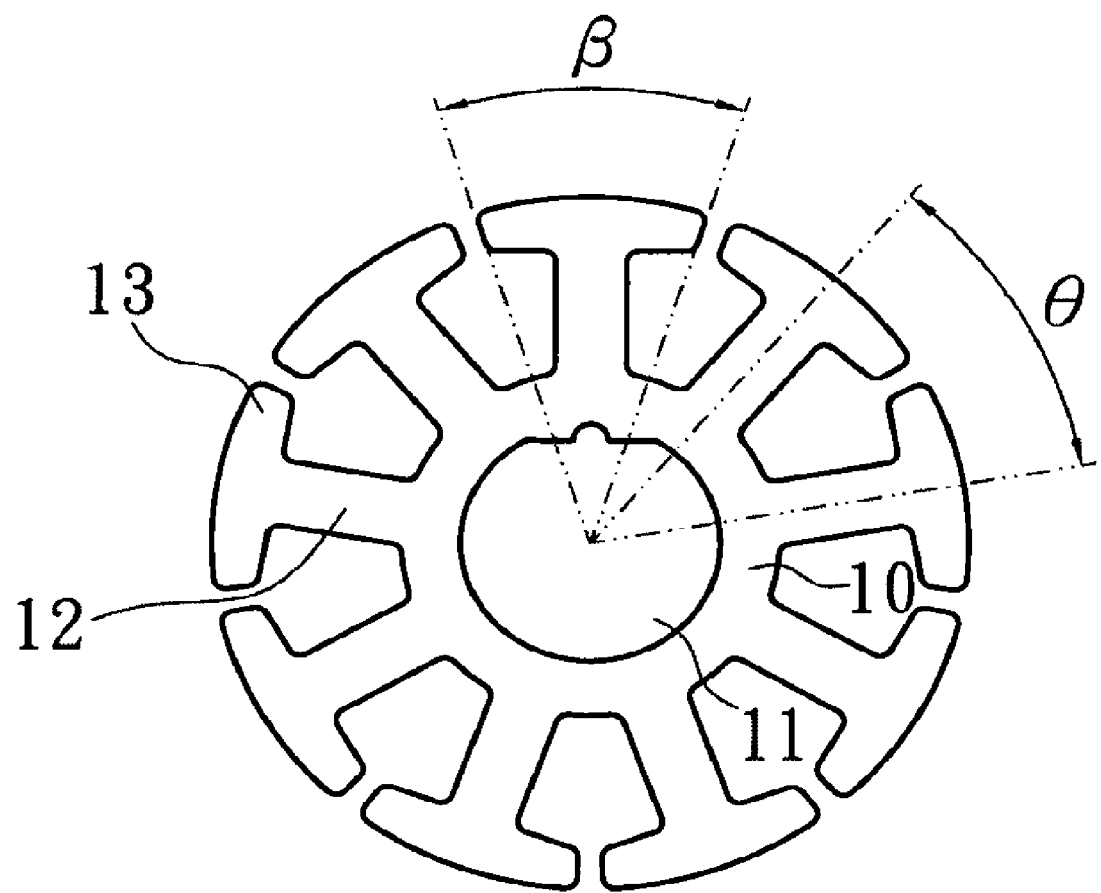
FIG. 2 is a schematic view showing a pole piece of stator with 9-pole radial winding of the present invention.

To make the object, features and efficacy of the present invention more comprehensive, two preferred embodiments concerning a six-pole pole piece structure of stator with radial winding (as shown in FIG. 1) and a nine-pole pole piece structure of stator with radial winding (as shown in FIG. 2) of the present invention are enumerated along with the detailed illustrative description.

The pole piece structure is formed by punching a plate material, and its external diameter is preferred in a range of 13~16 mm. The pole piece structure includes a hub 10 having a hole 11 at the center, a plurality of poles 12 integrally formed with the hub 10, having the number of at least six and a multiple of three, extended from the periphery of the hub 10 to radiate in a radial direction, and having a pole shoe 13 expanded from an end of each pole in a tangential direction.

The poles 12 extended in a radial direction are wound around by metal conductor to form a stator structure with radial winding, and the winding of metal conductor is preferred to be a three-phase winding. The tangentially expanded pole shoe 13 is the end of the sensing pole of the stator structure with radial winding.

The angle between two adjacent poles 12 is $\theta$ represented by the following equation, $$\theta = \frac{360°}{N} \quad (1)$$

where N is the number of poles 12. Hence, the $\theta$ is 60° for the six-pole pole piece structure of stator with radial winding as shown in FIG. 1 and 40° for the nine-pole pole piece structure of stator with radial winding.

Furthermore, a mechanical angle $\beta$ for the width of a single pole shoe 13 is divided by a mechanical angle $\theta$ of the pole pitch of two adjacent poles 12 to obtain a ratio $\alpha$ represented by the following equation, $$\alpha = \frac{\beta}{\theta} \quad (2)$$

where the value of α is preferred to be in a range of 0.86~0.95.

Further refer to FIG. 1. In accordance with the Eqn (2), the value of α is 0.867 if the mechanical angle for the width of the pole shoe 13 is set to be 52°, and the value of α is 0.9 if the mechanical angle for the width of the pole shoe 13 in FIG. 2 is set to be 52°. All the obtained values of α fall in the optimized range of 0.86~0.95.

As the value of α is proportional to the angle β, the bigger the angle β is, the greater the value of α is. As a result, the width of the optimized pole shoe 13 defined by the present invention is slightly greater than that of conventional pole piece structure of stator with radial winding, meaning that the present invention has a larger end of sensing pole (i.e. pole shoe). Therefore, under the premise of fixed inner diameter and outer diameter of the pole, the overlap region of the interphase inductance and torque is augmented so as to result in enhanced self-starting capability of motor, large output torque and small torque ripple.

In accordance with winding test actually performed by the inventor, it is known that automatic winding operation can still be smoothly completed with the metal conductor with a diameter of line, 0.36 mm, as shown in FIG. 1. As the requirement for diameter of line of metal conductor won't exceed 0.23 mm for a regular 13~16 mm stator with radial winding, the present invention won't be problematic in winding metal conductor.

Figure 3:
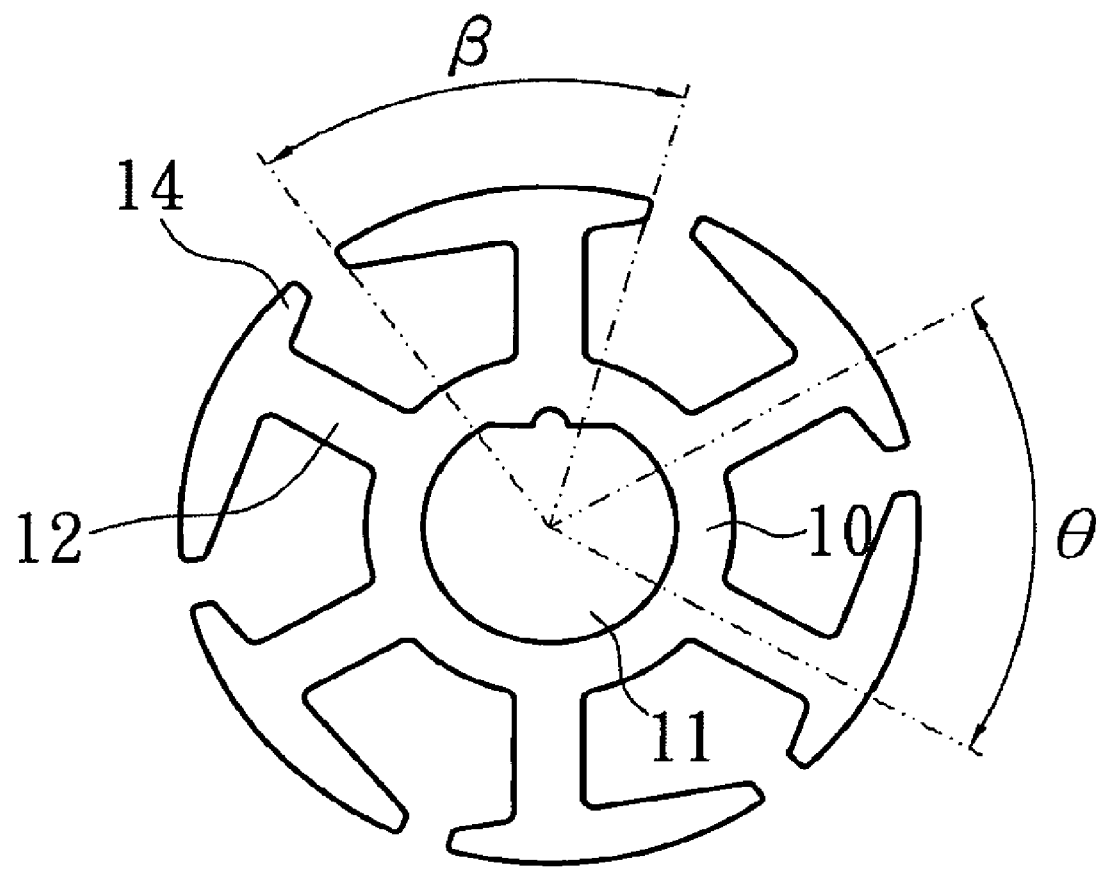
FIG. 3 is a schematic view showing another type of pole piece with 6-pole radial winding of the present invention.

Besides, another type of pole piece structure of 6-pole stator with radial winding is shown in FIG. 3, in which the pole shoes 14 are also expanded from their respective ends of the poles 12 in a tangential direction while they are formed in an asymmetrical manner.

A mechanical angle β for the width of a single pole shoe 13 is divided by a mechanical angle θ of the pole pitch of two adjacent poles 12 to obtain a ratio α represented by the following equation, $$\frac{\beta}{\theta} = \alpha$$

where the value of α is still preferred in a range of 0.86~0.95.

In sum, the present invention employs an optimum ratio α to define the form of the pole pieces, increase the overlap region of inductance and torque and lower the cogging torque of a motor, so as to strengthen the self-starting capability of the motor and minimize torque ripple to further elaborate the efficacy of motor. From the above-mentioned characteristics those features not only have a novelty among similar products and a progressiveness but also have an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A pole piece structure of stator with radial winding, comprising:
   a hub having a hole at a center; and
   a plurality of poles integrally formed with said hub, extended from a periphery of said hub to radiate in a radial direction, and having a pole shoe expanded from an end of each pole in a tangential direction;
   wherein an angle of said pole shoe is divided by a pitch angle of two adjacent said poles to obtain a ratio in a range of 0.86~0.95.

2. The pole piece structure of stator with radial winding as set forth in claim 1, wherein said pole piece is formed by punching a plate material with a proper thickness and a good magnetic property.

3. The pole piece structure of stator with radial winding as set forth in claim 1, wherein an external diameter of said pole piece structure is in a range of 13~16 mm.

4. The pole piece structure of stator with radial winding as set forth in claim 1, wherein the number of said poles is at least six and is a multiple of three.

5. The pole piece structure of stator with radial winding as set forth in claim 1, wherein said plural pole shoes are symmetrical with respect to a center line of said corresponding pole.

6. The pole piece structure of stator with radial winding as set forth in claim 1, wherein said plural pole shoes are asymmetrical with respect to a center line of said corresponding pole.

* * * * *